United States Patent
Kawano et al.

(10) Patent No.: US 7,355,767 B2
(45) Date of Patent: Apr. 8, 2008

(54) HOLOGRAM RECORDING METHOD AND HOLOGRAM RECORDING APPARATUS

(75) Inventors: Katsunori Kawano, Ashigarakami-gun (JP); Jiro Minabe, Ashigarakami-gun (JP); Yasuhiro Ogasawara, Ashigarakami-gun (JP); Kazuhiro Hayashi, Ashigarakami-gun (JP); Hisae Yoshizawa, Ashigarakami-gun (JP); Shin Yasuda, Ashigarakami-gun (JP); Koichi Haga, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 338 days.

(21) Appl. No.: 11/052,231

(22) Filed: Feb. 8, 2005

(65) Prior Publication Data
US 2006/0050339 A1  Mar. 9, 2006

(30) Foreign Application Priority Data
Sep. 8, 2004  (JP) .............................. 2004-261491

(51) Int. Cl.
*G03H 1/10* (2006.01)
(52) U.S. Cl. .............................. 359/10; 359/11; 359/29
(58) Field of Classification Search .................. 359/10, 359/11, 29
See application file for complete search history.

(56) References Cited

U.S. PATENT DOCUMENTS 6,141,441 A * 10/2000 Cass et al. .................. 382/166

6,452,890 B2    9/2002 Kawano et al.

FOREIGN PATENT DOCUMENTS

| JP | A 10-340479 | 12/1998 |
| JP | A 2000-182242 | 6/2000 |
| JP | A 2004-198816 | 7/2004 |

OTHER PUBLICATIONS

R.K. Kostuk; "Beam Conditioning Techniques for Holographic Recording Systems"; pp. 259-269; date unknown but prior to Feb. 8, 2005.
Toshio Numakura, Corona Publishing Co., Ltd., "Holography," Nov. 5, 1974, first edition, pp. 50-57.

* cited by examiner

*Primary Examiner*—Fayez G. Assaf
(74) *Attorney, Agent, or Firm*—Oliff & Berridge, PLC

(57) ABSTRACT

A hologram recording method includes generating a signal beam with data formed by superimposing pattern data, the pattern data representing a pattern in which a large number of plural kinds of pixels having different tone values are arranged in a two-dimensional manner, on an image data of respective pixels represented by tone values corresponding to density, and recording a hologram by irradiating a converted beam formed by Fourier transformation of the generated signal beam with a lens and a reference beam to an optical recording medium.

22 Claims, 5 Drawing Sheets

HOLOGRAM RECORDING METHOD AND HOLOGRAM RECORDING APPARATUS

CROSS-REFERENCE TO RELATED APPLICATION

This application claims priority under 35 USC 119 from Japanese Patent Application No. 2004-261491, the disclosure of which is incorporated by reference herein.

BACKGROUND OF THE INVENTION

1. Field of the Invention

The present invention relates to a hologram recording method and a hologram recording apparatus, and specifically, to a hologram recording method and a hologram recording apparatus capable of suppressing the distribution of a Fourier spectrum, preventing the deterioration in S/N ratio, and obtaining high diffraction efficiency.

2. Brief Description of the Related Art

In a holographic storage for recording data in a recording medium by a hologram, an object beam (signal beam) is Fourier transformed with a lens and is recorded. This holographic storage has advantages that it can record data with high density and it is tolerant of defects and misalignment of recording media and optical systems.

On the other hand, in the intensity distribution of a Fourier transformed image of the object beam, since a DC (direct current) component, i.e., zero-order component is often stronger than a high-frequency component and the DC component exceeds the dynamic range of the recording medium, it has been difficult to record high quality images. Especially, an analog image such as a face image contains many DC components as low-frequency components in image parts represented by cheeks and forehead, and the ratio of DC component to high-frequency component often becomes a four-digit number or more. Accordingly, it becomes difficult to linearly record a hologram in all Fourier spectrum regions, and thus, deterioration in S/N ratio and reduction in diffraction efficiency occur.

In order to solve the above described problems, suppression of DC components of the object beam is effective. In the digital holographic storage, recording is performed in a defocus position of the signal beam and a uniform Fourier transformed image is obtained using a random phase mask or pseudorandom phase mask (see, for example, Holographic Data Storage Springer pp. 259-269 and Japanese Patent Application Laid Open (JP-A) No. 2004-198816).

However, there are problems that DC components can not be suppressed sufficiently by the method of recording in a defocus position of the signal beam, and the alignment accuracy of the phase mask is required in the method of using the phase mask.

SUMMARY OF THE INVENTION

The present invention is achieved in order to solve the above described problems and provides a hologram recording method and a hologram recording apparatus capable of suppressing the distribution of a Fourier spectrum by a simple method without using a phase mask, preventing the deterioration in S/N ratio, and obtaining high diffraction efficiency.

A first aspect of the present invention is to provide a hologram recording method including: generating a signal beam with data formed by superimposing pattern data, the pattern data representing a pattern in which a large number of plural kinds of pixels having different tone values are arranged in a two-dimensional manner, on image data of respective pixels represented by tone values corresponding to density; and recording a hologram by irradiating a converted beam formed by Fourier transformation of the generated signal beam with a lens and a reference beam to an optical recording medium.

The signal beam is generated with data formed by superimposing the above described pattern data on the image data. Accordingly, periodical amplitude modulation is performed on the image data by the pattern data, and the signal beam formed by superimposing high-frequency carrier beam on the image beam obtained from the image data is generated. Since the high-frequency carrier beam is superimposed on the image beam, high-frequency components are superimposed on the regions containing many DC components of the analog image obtained from the image data by the high-frequency carrier beam, and the DC components are suppressed. Therefore, the distribution of a Fourier spectrum can be suppressed by a simple method, the deterioration in an S/N ratio can be prevented, and high diffraction efficiency can be obtained.

A second aspect of the present invention is to provide a hologram recording apparatus including: a lens for Fourier transformation for forming a Fourier transformed image on a hologram recording medium; a spatial light modulator device disposed at a front focal plane of the lens for spatially modulating irradiated light according to input data; a splitting and irradiation mechanism for splitting a laser beam irradiated by a laser beam irradiation mechanism into light for a signal beam and light for a reference beam, and irradiating the light for a signal beam to the spatial light modulator device and irradiating the light for a reference beam as a reference beam to the hologram recording medium; and an input mechanism for inputting data formed by superimposing pattern data, the pattern data representing a pattern in which a large number of plural kinds of pixels having different tone values are arranged in a two-dimensional manner, on image data with respective pixels represented by tone values corresponding to density, the data being input to the spatial light modulator device.

DETAILED DESCRIPTION OF THE INVENTION

Hereinafter, a hologram recording apparatus for implementing a hologram recording method according to an embodiment of the present invention will be described in detail by reference to the drawings.

Figure 1:
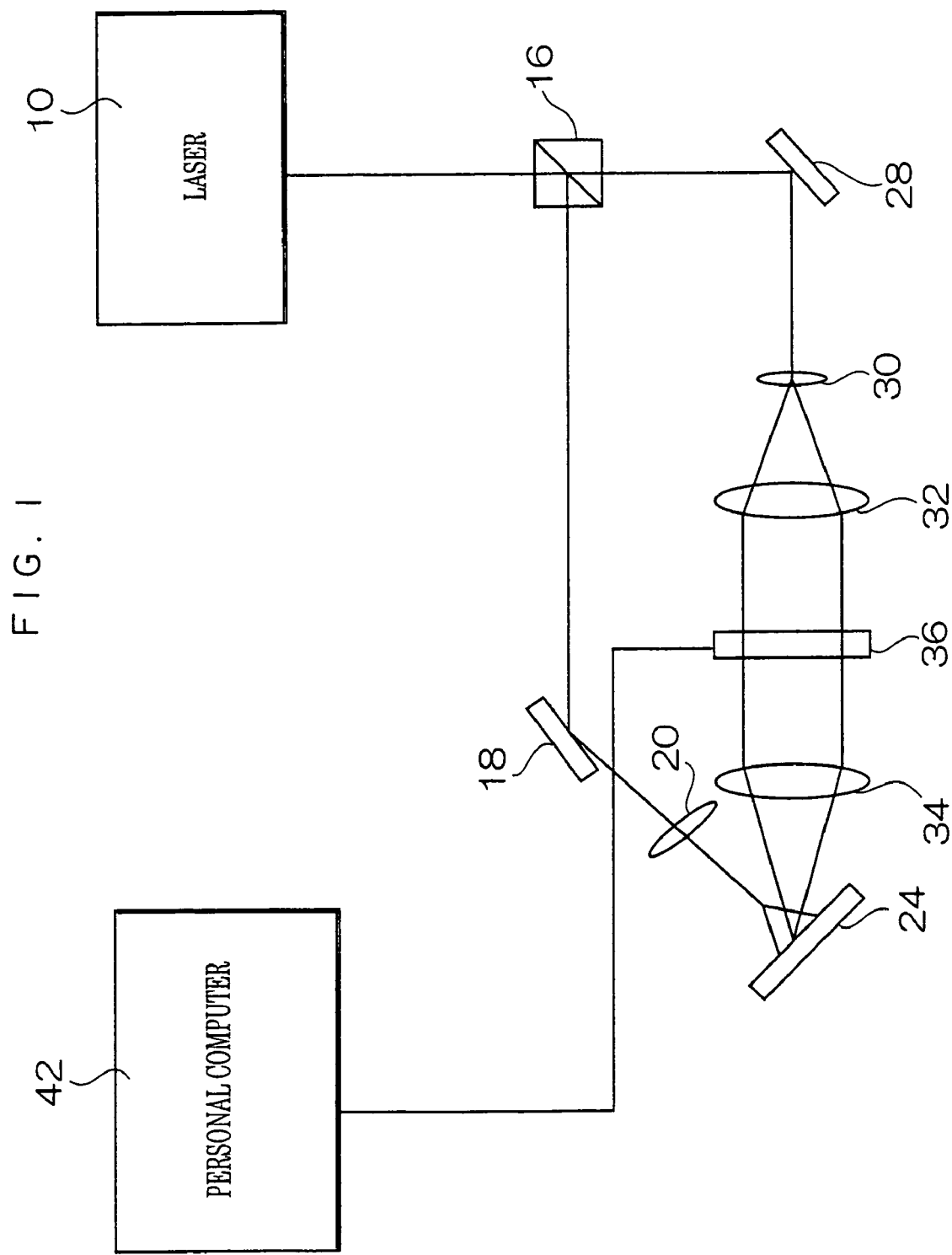
FIG. 1 is a schematic diagram showing a hologram recording apparatus usable for an embodiment of the present invention.

As shown in FIG. 1, the hologram recording apparatus of the present embodiment is provided with a laser 10 using, for example, a Nd:YVO$_4$ crystal. From the laser 10, a laser beam of 532 nm in wavelength as coherent light is oscillated and is emitted.

At the laser beam irradiation side of the laser 10, a polarization beam splitter 16 for splitting the laser beam into two beams of light for reference beam and light for signal beam by transmitting P-polarized light and reflecting S-polarized light is disposed.

At the light reflection side of the polarization beam splitter 16, a reflecting mirror 18 for reflecting the entered laser beam for the reference beam to change the optical path thereof into a hologram recording medium direction and an objective lens 20 for condensing the laser beam for reference beam to generate reference beam of spherical reference wave are disposed in order. The objective lens 20 irradiates S-polarized light of spherical reference wave as reference beam to a hologram recording medium 24.

At the light transmission side of the polarization beam splitter 16, a reflecting mirror 28 for reflecting the laser beam for signal beam at a reflection angle of 45° to change the optical path of the laser beam into the hologram recording medium direction and a lens system including lenses 30, 32, and 34 are disposed in order. At a front focal plane of the Fourier transforming lens 34, a transmissive spatial light modulator device 36 including a liquid crystal display device or the like for modulating the laser beam for signal beam according to the recording signal and generating the signal beam for recording a hologram is disposed. At a rear focal plane of the Fourier transforming lens 34, the hologram recording medium 24 is disposed.

An example of using the transmissive spatial light modulator device has been described as above. However, a reflective spatial light modulator device such as a DMD display or GLV display may be used.

The lenses 30 and 32 collimate the laser beam into a beam having a larger diameter and irradiate the parallel light to the spatial light modulator device 36. The Fourier transforming lens 34 forms a Fourier transformed image in a defocused condition on the hologram recording medium 24 with the P-polarized light modulated by and transmitted through the spatial light modulator device 36 located on the front focal plane.

Figure 3:
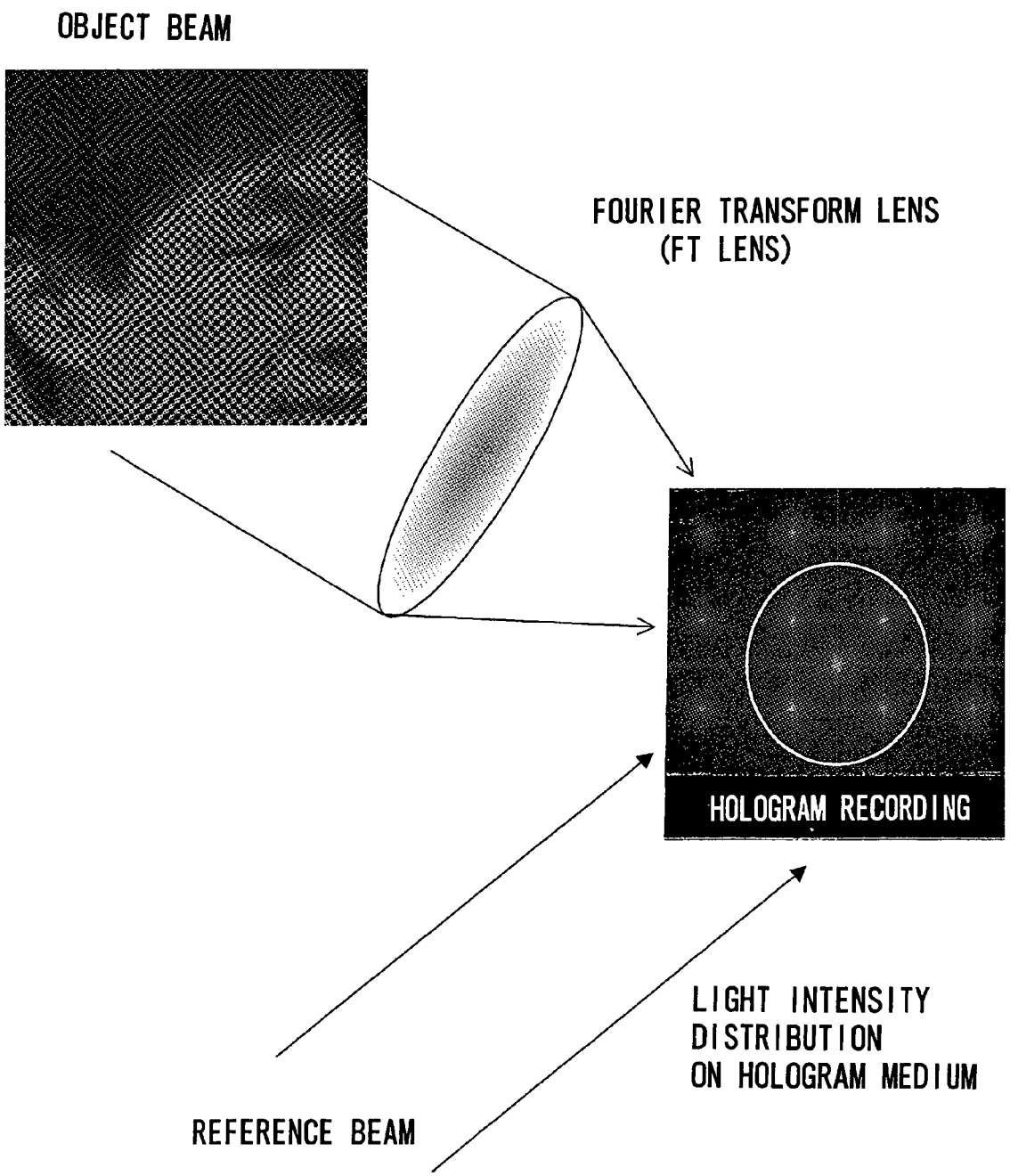
FIG. 3 is a schematic diagram showing an irradiation condition of a signal beam and a reference beam according to the embodiment of the present invention.

At this time, as shown in FIG. 3, condensed spots of the reference beams are formed so as to be irradiated to an irradiation region and a direct current region (the part shown by a circle on the hologram recording medium in FIG. 3) of high-order diffracted light of first or higher order of Fourier transformed image by the signal beam, and the signal beam and the reference beam are simultaneously irradiated to the hologram recording medium 24. Further, since the P-polarized light is used as the signal beam and the S-polarized light is used as the reference beam, the polarization direction of the signal beam and the polarization direction of the reference beam when a hologram is recorded are orthogonal to each other. Note that, the S-polarized light may be used as the signal beam and the P-polarized light may be used as the reference beam, and the signal beam and the reference beam with parallel polarization planes may be used. Further, circularly-polarized light rotating different directions may be used as the signal beam and the reference beam, respectively.

A personal computer 42 as an input mechanism is connected to the spatial light modulator device 36. The personal computer 42 generates data formed by superimposing pattern data on analog image data and inputs the data to the spatial light modulator device 36.

The hologram recording medium 24 can include an optical recording layer formed in a thick film having a thickness of 10 μm or more, for example. In the case where the strength of the optical recording layer carrier is insufficient, a substrate formed by a plate-like transparent medium such as quartz or plastic is provided on a single side or both sides thereof.

The optical recording layer, i.e., the photosensitive layer demonstrates photoinduction refractive index change or photoinduction dichroism. Any material can be used as long as the material is a photorefractive material or polarization sensitive material in which the photoinduction refractive index change or photoinduction dichroism is held at normal temperature, however, a polymer having a group for photoisomerization at a side chain, for example, a material of at least a kind of polymer selected from polyesters having a group for photoisomerization at the side chain thereof, for example, an azobenzene skeleton is suitable.

Further, a polyester having a cyanoazobenzene group at a side chain (see JP-A No. 10-340479, which is incorporated by reference herein) is suitable as a material for recording a hologram. This polyester can record the polarization direction of the signal beam as a hologram because of photoinduction anisotropy by the photoisomerization of the cyanoazobenzene group at the side chain and record a hologram at room temperature, and the recorded hologram is held semi-permanently.

Next, recording processing carried out by the personal computer 42 will be described.

Figure 2:
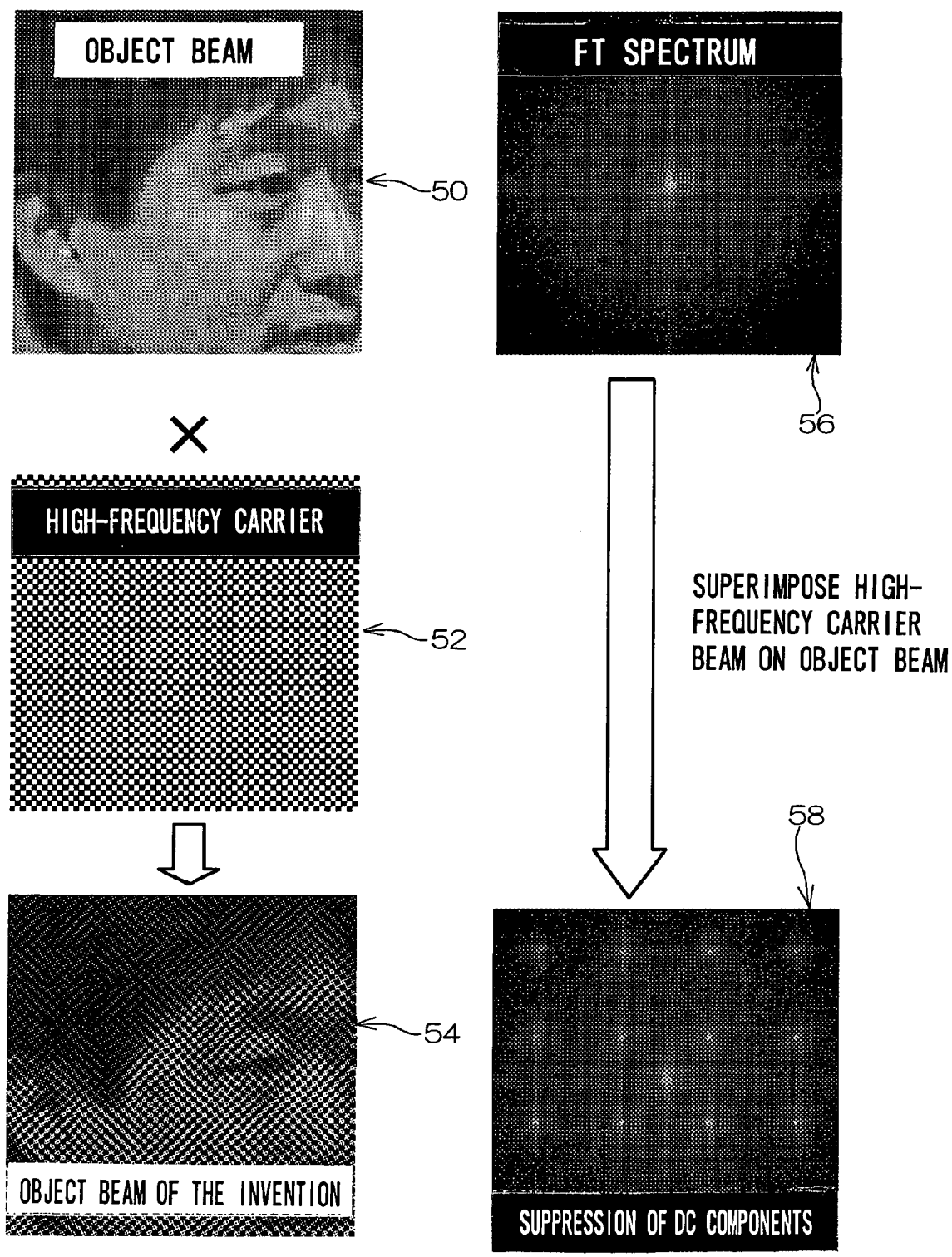
FIG. 2 is a schematic diagram showing an analog image, a pattern, an object beam, and a Fourier transform spectrum.

In a memory of the personal computer 42, image data representing an analog image 50 shown in FIG. 2 and pattern data representing a pattern (chessboard pattern) 52 in which a large number of two kinds of pixels having tone values of 0 and 1, respectively, are arranged alternately in a two-dimensional manner in longitudinal directions and lateral directions are stored. Since this analog image is a face image, for example, many DC components as low-frequency components are contained in image parts represented by cheeks and forehead.

Further, the size of each pixel of the pattern 52 is determined so as to be equal to the size of the pixel (1×1 pixel) of the analog image 50. Accordingly, the pixel pitch of the pattern 52 is equal to the pixel pitch of the analog image 50.

The analog image is expressed at 256 levels by 8-bit data representing density. Accordingly, the minimum value of the tone value (brightness value) representing the pixel of the analog image is 0 (black pixel with the maximum density) and the maximum value is 255 (white pixel with the minimum density). When this image data representing the analog image is input to the spatial light modulator device 36, the analog image 50 is displayed on the spatial light modulator device 36. Since the light for signal beam transmitted through the lens 32 is transmitted through the spatial light modulator device 36, the object beam (signal beam) corresponding to the analog image 50 is obtained, and a Fourier transformed image 56 having a Fourier transform spectrum is formed on the hologram recording medium.

Further, since the tone value of each pixel of the pattern 52 is 0 or 1, by multiplying the tone value of the pixel representing the analog image by 0 (black pixel), the tone value can be converted into 0, that is, the pixel of the analog image can be converted into a black pixel. Therefore, this multiplication is equivalent to that the light of the pixel of the analog image corresponding to the pixel of the pattern is blocked by the pixel having the tone value of 0 of the pattern. Further, since the tone value does not change even when the tone value of the pixel representing the analog image is multiplied by 1 (white image), this multiplication is equivalent to that the light of the pixel of the analog image corresponding to the pixel having the tone value of 1 of the pattern is transmitted without change.

In the personal computer, the tone values of the respective pixels of the analog image represented by the image data are multiplied by tone values of the corresponding respective pixels of the pattern, and the data obtained by the multiplication is supplied to the spatial light modulator device. In this way, as shown in FIG. 2, converted image data representing a converted image 54 in which the pixels of the analog image corresponding to the pixels with tone values of 0 of the pattern have been converted into black pixels is obtained. Since the pixels of the image portions represented by cheeks and forehead of the analog image are converted into pixels with the lowest brightness values with respect to each pixel by the conversion, DC components in regions containing many DC components are suppressed.

When the converted image data is input to the spatial light modulator device 36, the converted image 54 is displayed on the spatial light modulator device 36 and the light for signal beam transmitted through the lens 32 is transmitted through the spatial light modulator device 36. In this way, an object beam (signal beam) corresponding to the converted image 54 is produced. That is, the signal beam formed by superimposing a high-frequency carrier beam on the image beam obtained from the image data is produced. Since the high-frequency carrier beam is superimposed on the image beam, DC components of the signal beam are suppressed and a Fourier transformed image 58 having a Fourier transform spectrum in which DC components have been suppressed is formed on the hologram recording medium.

In the present embodiment, the signal beam is Fourier transformed by the lens 34 and is irradiated to the hologram recording medium as a recording medium as well as in a normal holographic storage. Using the lens 34, relatively strong light intensity can be obtained on the hologram recording medium surface. A Fourier converted hologram is recorded when the distance between the Fourier transforming lens 34 and the hologram recording medium and the focal length of the lens are made equal, however, in the present embodiment, the recording medium is slightly displaced from the focus position of the lens for the purpose of suppressing the intensity of the zero-order diffraction light of the signal beam on the recording surface, that is, defocused and hologram recording is performed.

An example of using a pattern formed by pixels with tone values of 0 and 1 has been described as above. However, a pattern may be expressed with two kinds of pixels with the tone values of the minimum value 0 and the maximum value 255 of the tone values of the image data, the tone values of the respective pixels of the pattern corresponding to the respective pixels of the analog image represented by the image data may be subtracted from the tone value of the respective pixels of the analog image, the differences may be converted so that the minimum value of the obtained differences may correspond to the minimum value of the tone values of the image data and the maximum value of the obtained differences may correspond to the maximum value of the tone values of the image data, and data representing the converted differences may be input to the spatial light modulator device to generate the signal beam.

Further, the image data is multiplied by pattern data formed by a matrix in which two kinds of parameters having different magnitudes equal to or less than 1 such as 0.25 and 0.75 are alternately arranged, data representing the obtained products are input to the spatial light modulator device, and thereby, the signal beam may be generated.

Figure 4:
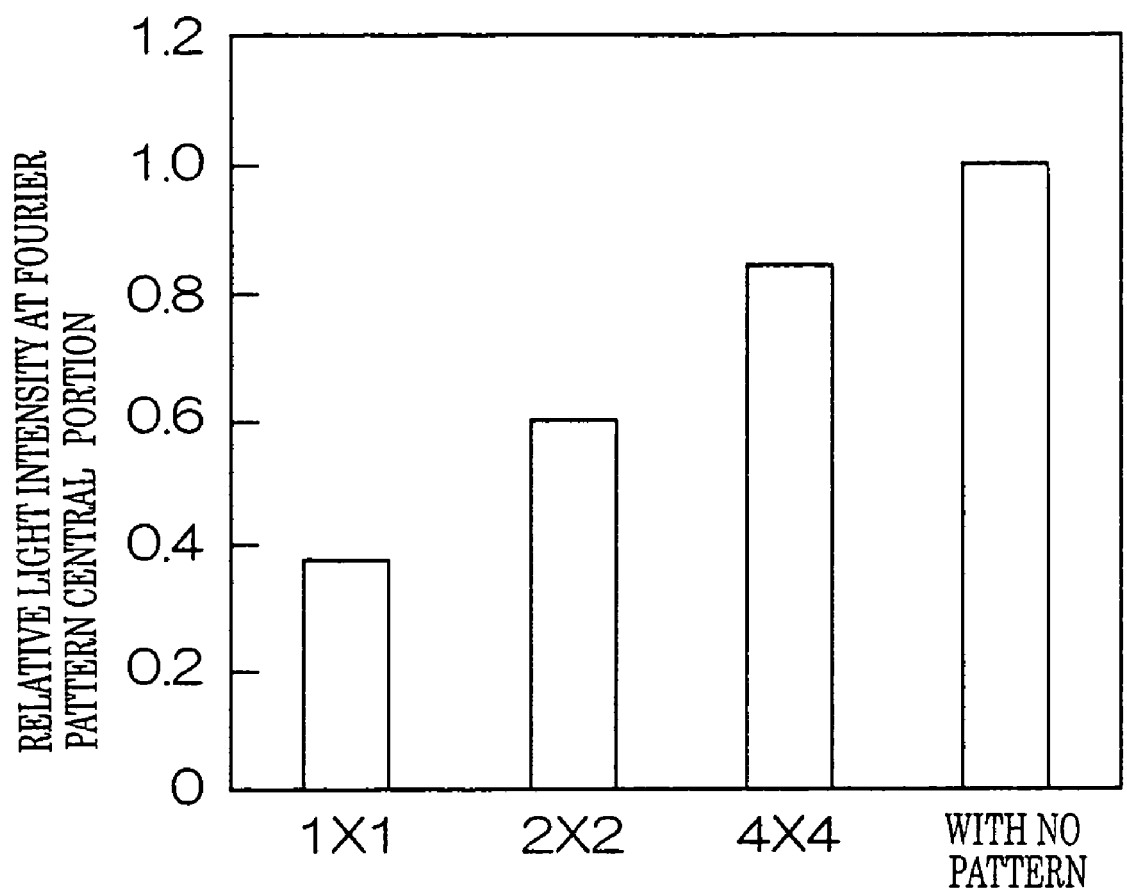
FIG. 4 is a graph which comparatively shows relative light intensity at a Fourier pattern central portion when the size of the pixel of the checker pattern is changed.

Next, the result of comparison between the relative light intensity at the Fourier pattern central portion when the size of the pixel of the checker pattern is changed is shown in FIG. 4. The size of the pixel of the pattern is set to 1×1 pixel (the same size as the size of the pixel of the analog image), 2×2 pixels (four times the size of the pixel of the analog image), and 4×4 pixels (16 times the size of the pixel of the analog image), and the relative light intensity at the Fourier pattern central portion when no pattern is used is also shown for comparison. As understood from the drawing, the larger the size of the pixel of the pattern, the higher the relative light intensity at the Fourier pattern central portion becomes.

Figure 5:
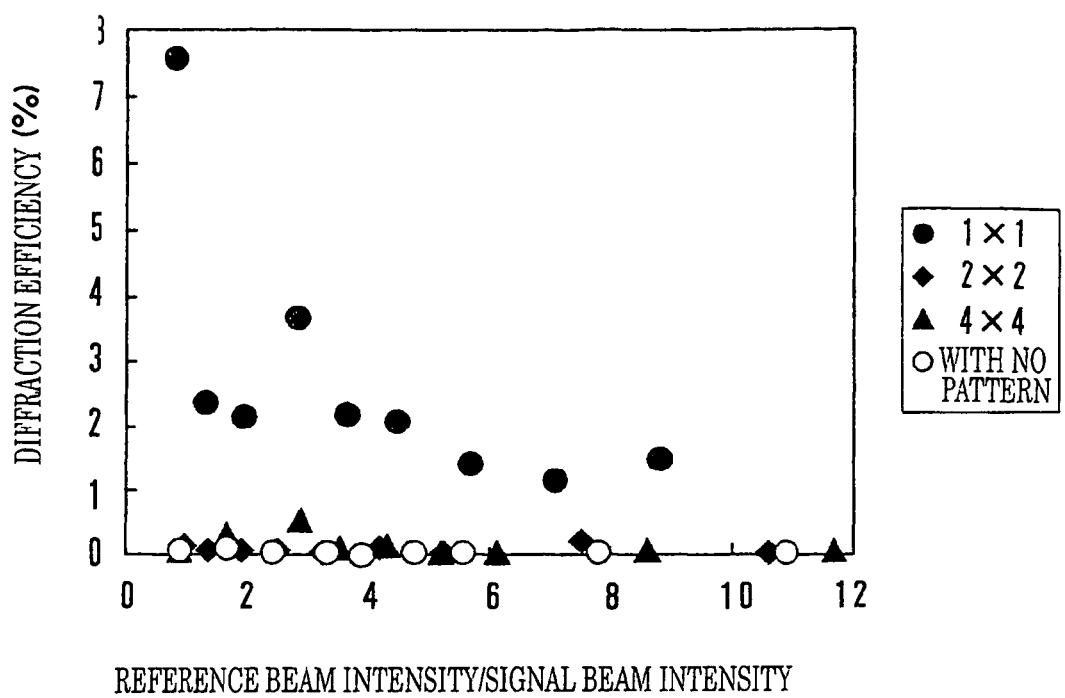
FIG. 5 is a graph which shows the relationship between the ratio of the intensity of the reference beam to the intensity of the signal beam and diffraction efficiency.
Figure 6:
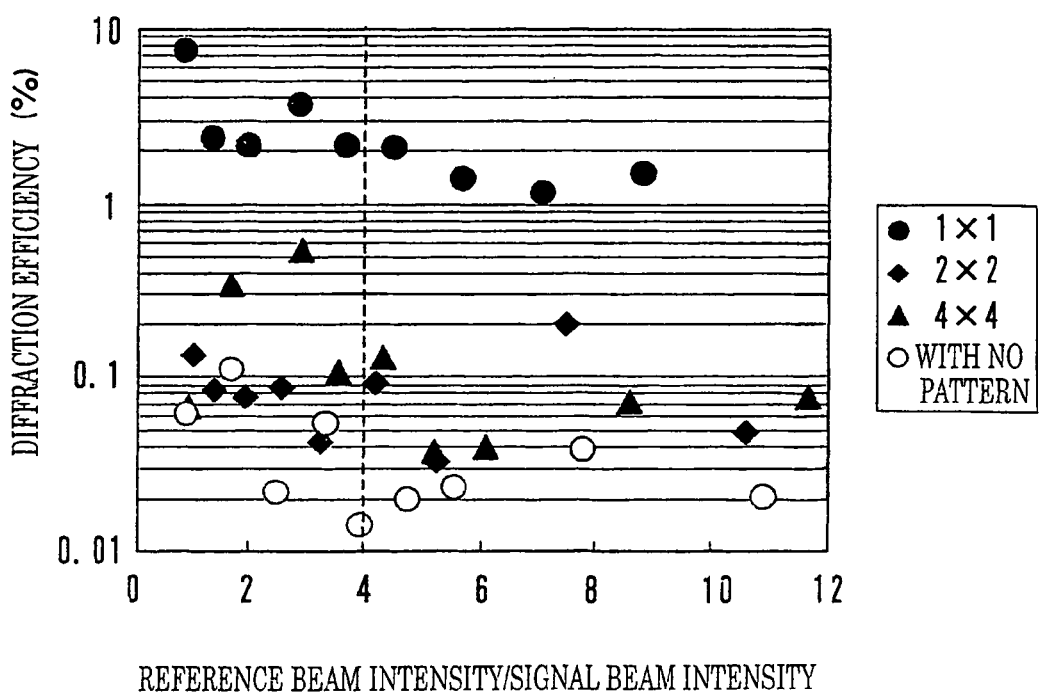
FIG. 6 is a graph which shows the relationship between the ratio of the intensity of the reference beam to the intensity of the signal beam and diffraction efficiency.

Further, the relationships between the ratio of the intensity of the reference beam to the intensity of the signal beam and the diffraction efficiency are shown in FIGS. 5 and 6. As understood from the drawing, the diffraction efficiency when the pattern data is superimposed is higher, and the larger the size of the pixel of the pattern, the lower the diffraction efficiency becomes.

Therefore, it is preferable that the size of the pixel of the pattern is equal to or larger than the size of the pixel of the analog image and equal to or smaller than 16 times the size of the pixel of the analog image. Further, it is preferable that the size of the pixel of the pattern is equal to or larger than the size of the pixel of the analog image and equal to or smaller than four times the size of the pixel of the analog image.

In addition, when defocusing, it is preferable that the pitch $\Lambda$ of the pixel of the pattern is set to the size that satisfies the following relationship.

$$\Lambda < 4f\lambda(f-d)/Ld$$

Note that f is the focal length of a lens, $\lambda$ is a wavelength of a signal beam, d is a defocus amount of the signal beam with respect to a recording medium, and L is a length of a side of an analog image obtained from image data. The constant 4 corresponds to the maximum value of a preferable pixel pitch when a Fourier converted image is formed on the recording medium by focusing the signal beam.

The data in FIG. 6 is experimental values using f=50 mm, $\lambda$=532 nm, d=8 mm, L=15 mm, and the pixel pitch of the spatial light modulator of 19 μm. At this time, the pixel pitch when the 1×1 pixel chess board pattern is superimposed becomes $\Lambda$=19 μm, for the 2×2 pixels, becomes $\Lambda$=38 μm, and, for the 4×4 pixels, becomes $\Lambda$=76 μm. Comparing the diffraction efficiency when the ratio of the reference beam to the signal beam is 4, the image formed by superimposing the 1×1 pixel chess board pattern provides the highest diffraction efficiency compared with the case where no chess board pattern is superimposed or another larger chess board is used. Further, when the defocus amount d is set to the half, 4 mm, higher diffraction efficiency can be obtained with the 2×2 pixel chess board and the 1×1 pixel chess board. Similarly, when the defocus amount d is set to 2 mm, higher diffraction efficiency can be obtained with the 4×4, 2×2, 1×1 pixel chess boards. From the result, very high diffraction efficiency is obtained in the range in which the relationship between the defocus amount d and the pitch $\Lambda$ satisfies the relationship described above.

An example of recording in the defocus condition has been described as above. However, the recording may be performed in the focus condition without defocusing. Further, in the above description, as shown in FIG. 3, an example of applying the reference beam to a portion (circled part) of the Fourier converted image has been described. However, the condensed spot of the reference beam may be made larger than the Fourier converted image to irradiate the reference beam to the whole Fourier converted image.

Further, in the above description, an example of superimposing the pattern data on the image data has been described. However, an image beam obtained by modulating the spatial light modulator device based on the image data in which the respective pixels are represented with tone values corresponding to the density may be transmitted through a pattern having plural light transmitting portions and plural light blocking portions, a large number of the light transmitting portions and the light blocking portions arranged alternately in a two-dimensional manner in a predetermined direction and a direction intersecting the predetermined direction to generate a signal beam.

As described above, in the present embodiment of the invention, DC components can be suppressed by expressing a pattern with two kinds of pixels having the minimum value and the maximum value of the tone values of the image data as tone values, respectively, subtracting the tone values of the respective pixels of the pattern corresponding to the respective pixels of the analog image represented by the image data from the tone values of the respective pixels of the analog image, converting the obtained differences so that the minimum value of the differences may correspond to the minimum value of the tone values of the image data and the maximum value of the differences may correspond to the maximum value of the tone values of the image data, and generating a signal beam with the data representing the converted differences.

Further, the DC components may be suppressed by expressing a pattern with two kinds of pixels having tone values of 0 and 1, respectively, multiplying the tone values of the respective pixels of the analog image represented by the image data by the tone values of the respective pixels of the pattern corresponding to the respective pixels, and generating the signal beam by the obtained products.

Furthermore, the size of the pixel of the pattern is preferably made equal to or larger than the pixel of the analog image represented by the image data and equal to or smaller than four times the size of the pixel of the analog image. It is not preferable that the size of the pixel of the pattern is made smaller than the size of the pixel of the analog image because the focal depth of the reproduced image becomes shallow, or that the size of the pixel of the pattern is made larger than four times the size of the pixel of the analog image because the analog image as an original image becomes deteriorated. It is most preferable that the size of the pixel of the pattern is made equal to the size of the pixel of the analog image because high diffraction efficiency is obtained, there is no image deterioration, and a sufficient focal depth is obtained.

Further, in the embodiment of the invention, a hologram may be recorded by irradiating a reference beam to high-order diffraction light of first or higher order of the converted beam and the direct current regions. In this way, the diffraction efficiency in the parts where S/N ratios are easily deteriorated can be made higher in an intensive manner.

Further, it is preferable that a hologram is recorded in a condition in which the signal beam is defocused relative to the recording medium. When defocusing, it is preferable that the pitch A of the pixel of the pattern may satisfy the following relationship.

$$\Lambda < 4f\lambda(f-d)/Ld$$

Note that f is the focal length of a Fourier transforming lens, $\lambda$ is a wavelength of a signal beam, d is a defocus amount of the signal beam with respect to a recording medium, and L is a length of a side of an analog image obtained by image data.

It is not preferable that the pitch $\Lambda$ of the pixel of the pattern is made equal to or larger than $4f\lambda(f-d)/Ld$ because the analog image as an original image becomes deteriorated. Further, since the focal depth of the reproduced image becomes shallow when the pitch $\Lambda$ of the pixel of the pattern is made too small, it is preferable that the lower limit value of the pitch $\Lambda$ of the pixel of the pattern is made equal to the pixel pitch of the analog image obtained by the image data.

As described above, by the hologram recording method and the hologram recording apparatus according to the embodiment of the present invention, the distribution of a Fourier spectrum can be suppressed by a simple method without using a phase mask, the deterioration in S/N ratio can be prevented, and high diffraction efficiency can be obtained.

What is claimed is:

1. A hologram recording method comprising:
   generating a signal beam by superimposing a high-frequency carrier beam on an image beam with data formed by superimposing pattern data, the pattern data representing a pattern in which a large number of plural kinds of pixels having different tone values are arranged in a two-dimensional manner, on the image data of respective pixels represented by tone values corresponding to density; and
   recording a hologram by irradiating a converted beam formed by Fourier transformation of the generated signal beam with a lens and a reference beam to an optical recording medium.

2. The hologram recording method of claim 1, further comprising:
   expressing the pattern with two kinds of pixels having a minimum value and a maximum value of the tone values of the image data as tone values, respectively, and subtracting the tone values of the respective pixels of the pattern corresponding to the respective pixels of an analog image represented by the image data from the tone values of the respective pixels of the analog image;
   converting obtained differences such that a minimum value of the differences corresponds to the minimum value of the tone values of the image data and a maximum value of the differences corresponds to the maximum value of the tone values of the image data; and
   generating the signal beam with data representing the converted differences.

3. The hologram recording method of claim 1, further comprising:
   expressing the pattern with two kinds of pixels having tone values of 0 and 1, respectively, multiplying the tone values of the respective pixels of the analog image represented by the image data by the tone values of the respective pixels of the pattern corresponding to the respective pixels of the analog image, and generating the signal beam with data representing the obtained products.

4. The hologram recording method of claim 1, wherein the size of the pixels of the pattern is equal to or larger than the size of the pixels of the analog image represented by the image data and equal to or smaller than 16 times the size of the pixels of the analog image.

5. The hologram recording method of claim 1, wherein a hologram is recorded by irradiating the reference beam to an irradiation area of high-order diffraction light of first or higher order of the converted beam and to direct current component regions.

6. The hologram recording method of claim 1, wherein a hologram is recorded under a condition in which the signal beam is defocused relative to the recording medium.

7. The hologram recording method of claim 1, wherein a pitch $\Lambda$ of the pixels of the pattern satisfies the following relationship:

$$\Lambda < 4f\lambda(f-d)/Ld$$

wherein f is the focal length of the lens, $\lambda$ is a wavelength of the signal beam, d is a defocus amount of the signal beam with respect to the recording medium, and L is a length of a side of the analog image obtained by the image data.

8. The hologram recording method of claim 1, wherein the size of the pixels of the pattern is equal to or larger than the size of the pixels of the analog image represented by the image data and equal to or smaller than four times the size of the pixels of the analog image.

9. The hologram recording method of claim 1, wherein the pattern data is pattern data representing a pattern in which a large number of plural kinds of pixels having different tone values are arranged in a two-dimensional manner in a predetermined direction and a direction intersecting the predetermined direction.

10. The hologram recording method of claim 9, wherein the pattern data is pattern data representing a large number of patterns arranged alternately.

11. The hologram recording method of claim 1, wherein the size of the pixels of the pattern is equal to the size of the pixels of the analog image represented by the image data.

12. A hologram recording apparatus comprising:
a lens for Fourier transformation for forming a Fourier transformed image on a hologram recording medium;
a spatial light modulator device disposed at a front focal plane of the lens for spatially modulating irradiated light according to input data;
a splitting and irradiation mechanism for splitting a laser beam irradiated by a laser beam irradiation mechanism into light for a signal beam and light for a reference beam, and irradiating the light for a signal beam to the spatial light modulator device and irradiating the light for a reference beam as a reference beam to the hologram recording medium; and
an input mechanism for superimposing a high-frequency carrier beam on an image beam inputting data formed by superimposing pattern data, the pattern data representing a pattern in which a large number of plural kinds of pixels having different tone values are arranged in a two-dimensional manner, on the image data with respective pixels represented by tone values corresponding to density, the data being input to the spatial light modulator device.

13. The hologram recording apparatus of claim 12, wherein the input mechanism expresses the pattern with two kinds of pixels having a minimum value and a maximum value of the tone values of the image data as tone values, respectively, subtracts the tone values of the respective pixels of the pattern corresponding to the respective pixels of an analog image represented by the image data from the tone values of the respective pixels of the analog image, converts obtained differences such that a minimum value of the differences corresponds to the minimum value of the tone values of the image data and a maximum value of the differences corresponds to the maximum value of the tone values of the image data, and inputs data representing the converted differences to the spatial light modulator device.

14. The hologram recording apparatus of claim 12, wherein the input mechanism expresses the pattern with two kinds of pixels having tone values of 0 and 1, respectively, multiplies the tone values of the respective pixels of the analog image represented by the image data by the tone values of the respective pixels of the pattern corresponding to the respective pixels of the analog image, and inputs data representing the obtained products to the spatial light modulator device.

15. The hologram recording apparatus of claim 12, wherein the size of the pixels of the pattern is equal to or larger than the size of the pixels of the analog image represented by the image data and equal to or smaller than 16 times the size of the pixels of the analog image.

16. The hologram recording apparatus of claim 12, wherein a hologram is recorded by irradiating the reference beam to an irradiation area of high-order diffraction light of first or higher order of the converted beam and to direct current component regions.

17. The hologram recording apparatus of claim 12, wherein a hologram is recorded under a condition in which the signal beam is defocused relative to the recording medium.

18. The hologram recording apparatus of claim 12, wherein a pitch $\Lambda$ of the pixels of the pattern satisfies the following relationship:

$$\Lambda < 4f\lambda(f-d)/Ld$$

wherein f is the focal length of the lens, $\lambda$ is a wavelength of the signal beam, d is a defocus amount of the signal beam with respect to the recording medium, and L is a length of a side of the analog image obtained by the image data.

19. The hologram recording apparatus of claim 12, wherein the size of the pixels of the pattern is equal to or larger than the size of the pixels of the analog image represented by the image data and equal to or smaller than four times the size of the pixels of the analog image.

20. The hologram recording apparatus of claim 12, wherein the pattern data is pattern data representing a pattern in which a large number of plural kinds of pixels having different tone values are arranged in a two-dimensional manner in a predetermined direction and a direction intersecting the predetermined direction.

21. The hologram recording apparatus of claim 20, wherein the pattern data is pattern data representing a large number of patterns arranged alternately.

22. The hologram recording apparatus of claim 12, wherein the size of the pixels of the pattern is equal to the size of the pixels of the analog image represented by the image data.

* * * * *